United States Patent
Land

[15] 3,664,250
[45] May 23, 1972

[54] COMPACT VARIABLE FRAME VIEWFINDER

[72] Inventor: Edwin H. Land, Cambridge, Mass.
[73] Assignee: Polaroid Corporation, Cambridge, Mass.
[22] Filed: June 11, 1970
[21] Appl. No.: 45,418

[52] U.S. Cl. .................................95/44 C, 356/8, 356/12
[51] Int. Cl. ...........................................G03b 13/20, G01c
[58] Field of Search ........................95/44 C, 44 R; 356/12, 8

[56] References Cited

UNITED STATES PATENTS

| | | | |
|---|---|---|---|
| 2,300,245 | 10/1942 | Bell | 95/44 |
| 3,035,501 | 5/1962 | Peterson | 95/44 |
| 3,081,664 | 3/1963 | Papke | 95/44 |

Primary Examiner—Samuel S. Matthews
Assistant Examiner—Richard A. Wintercorn
Attorney—Brown and Mikulka, William D. Roberson and Frederick H. Brustman

[57] ABSTRACT

A photographic camera is disclosed as having a variable frame viewfinder comprising a plurality of discrete reticles respectively defining framing marks and a corresponding plurality of reticle imaging means, one associated with each of the reticles, for projecting virtual images of the framing marks into the viewed field. The reticles and associated imaging means are positioned on the periphery of the field of view of the observer such that the virtual images of the framing marks cooperate when viewed in composite to frame a portion of the scene. Frame varying means coupled to the reticles and responsive to adjustments in a focus control mechanism on the camera operate to vary in accordance with a predetermined program the framed portion of the scene so as to compensate for sighting parallax and field size changes.

14 Claims, 5 Drawing Figures

Patented May 23, 1972

INVENTOR
EDWIN H. LAND

BY Brown and Mikulka
and
John H. Coult
ATTORNEYS

Patented May 23, 1972

INVENTOR
EDWIN H. LAND

BY Brown and Mikulka
and
John H. Coult
ATTORNEYS

Patented May 23, 1972 3,664,250

INVENTOR
EDWIN H. LAND

BY Brown and Mikulka
and
John H. Coult
ATTORNEYS

COMPACT VARIABLE FRAME VIEWFINDER

BACKGROUND OF THE INVENTION

Early frame-type viewfinders were simple and, except for sighting parallax errors, were very accurate. With this type of finder the field is seen in natural brightness. Field size changes are correctable by mounting the front sight so as to follow lens focus adjustments. However, because of the inherent volume occupied by the frame-type viewfinder, it is not suitable for use in compact non-collapsible cameras. Further, the dark frame created by this type of finder is difficult to observe in low ambient lighting conditions.

To overcome these limitations in frame finders, the direct viewfinders were introduced. These so-called Newton finders comprise an inverted Galilean telescope, consisting of a forward negative element and a positive rear element. These finders present an erect field image in its natural luminance; however, the field is demagnified and the frame boundaries, which are usually defined by masking a rectangular window on the forward negative lens element, are not within the depth of field of the finder optical system and are thus seen out of focus.

The Albada finder projects a bright frame far into the viewed field where it can be viewed in focus by the observer. Further, the Albada finder frames but a portion of the visible field, allowing the observer to view parts of the field not within the field of view of the camera objective lens. This type of viewfinder suffers, however, from having reduced field brightness due to the necessary use of a semi-transparent mirror across the field of view employed to reflect the frame image into the field of view.

A modification of the Albada finder, sometimes termed the brilliant frame finder, employs a separate viewfinder window to illuminate a frame-defining mask. An image of the backlighted bright frame is reflected onto the primary view axis by a parallel pair of angled mirrors. As in the Albada finder, the frame appears very bright and in focus at infinity. However, it is even more bulky than the Albada finder, has a field of similarly reduced brightness, and like the Albada finder is apt to produce a distorted frame unless the power of the imaging lens used to project the frame image is moderate. With today's ever greater trend toward compactness in cameras, the resultant relatively long focal lengths in this type of finder are apt to be undesirably space-consuming.

Moderately priced cameras embodying any of the above-described optical finders generally suffer from demagnification limitations; i.e., the viewed field size is reduced. In the brilliant-frame type of finder, for example, it is difficult to obtain a full-sized field image without resorting to magnification lenses which are either expensive or wasteful of space.

OBJECTS OF THE INVENTION

It is an object of this invention to provide a viewfinder combining the advantages of both the simple frame-type finder and the optical finders. More specifically, it is an object to provide a novel viewfinder projecting into a viewed field of natural brightness and full size a brilliant and substantially undistorted frame image observable in focus by the viewer.

Another object is to provide such a viewfinder which is extremely compact, and which is simple in structure and operation, and inexpensive to manufacture.

Still another object is to provide such a viewfinder for a photographic camera having the capability of varying the framed portion of the viewed field to compensate for field size changes and sighting parallax errors.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

Figure 1:
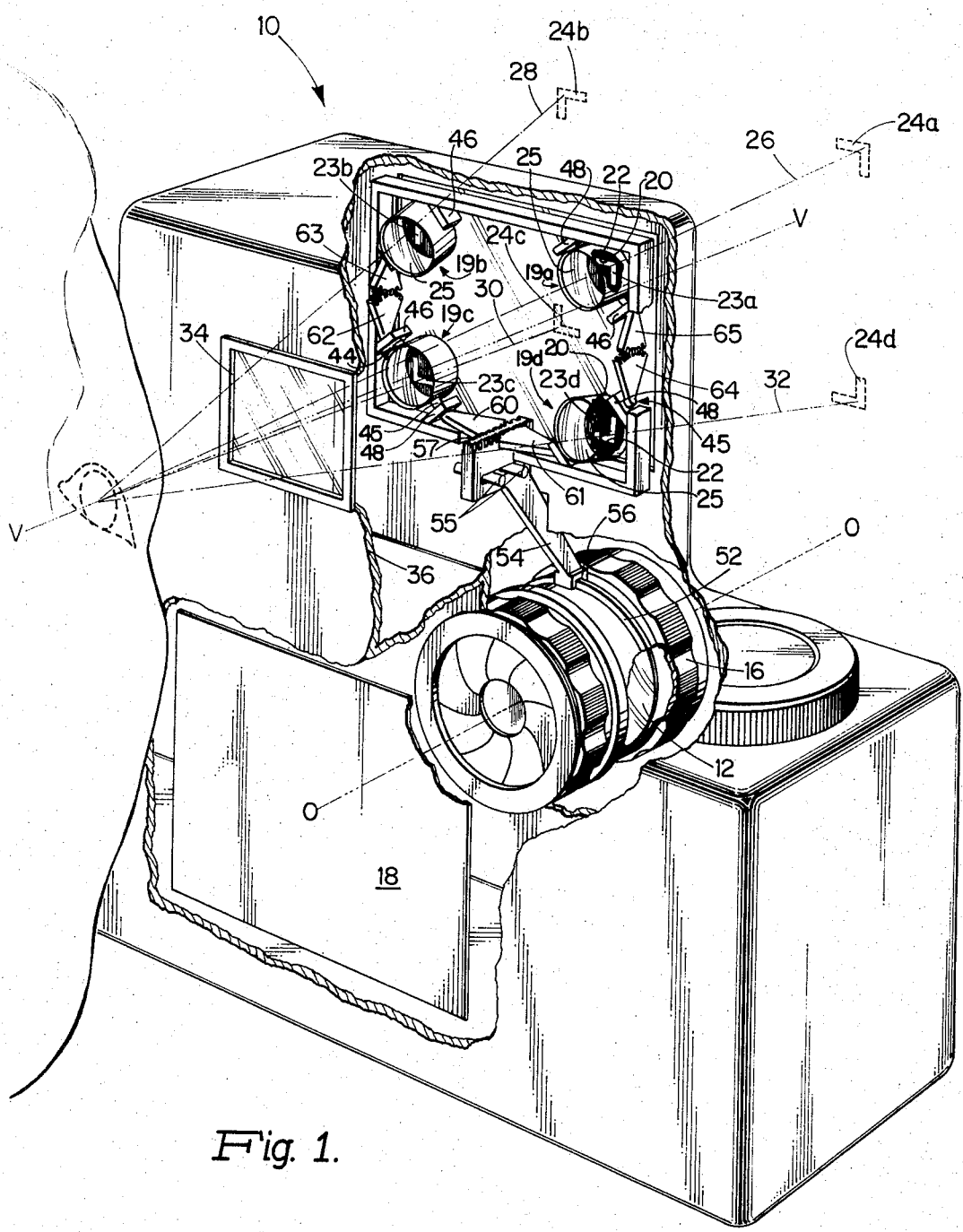
FIG. 1 is a schematic fragmentary perspective view of a camera embodying a novel coupled viewfinder implementing the principles of this invention.
Figure 3:
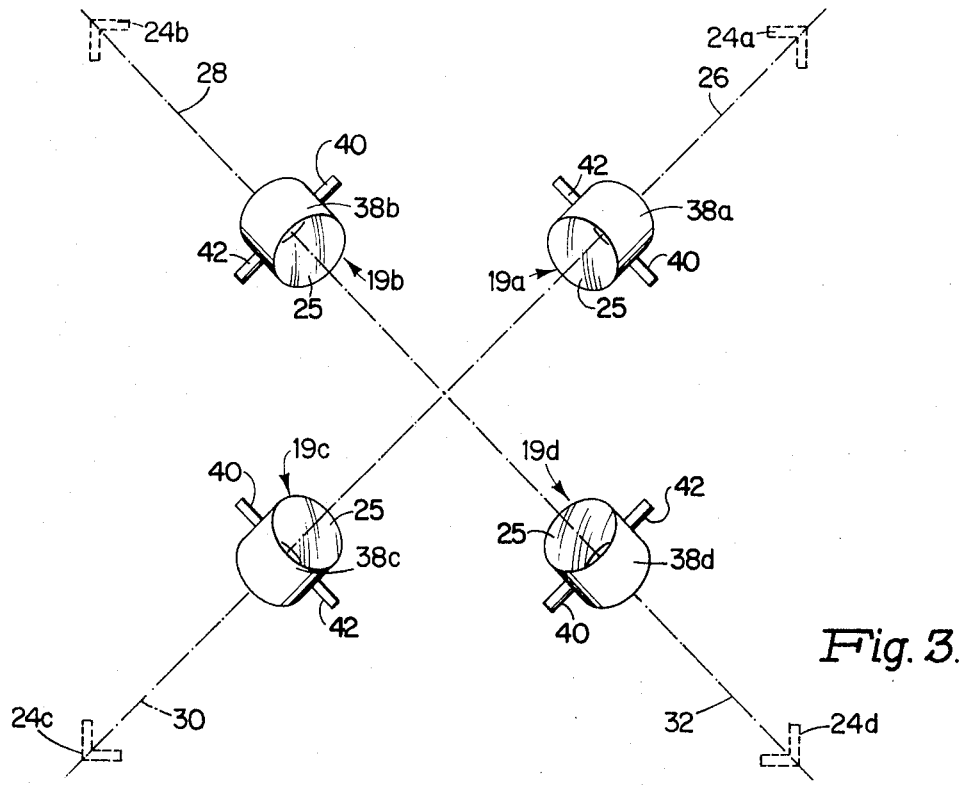
FIGS. 2 and 3 are highly schematic front elevational and top(plan) views of the FIG. 1 viewfinder.
Figure 2:
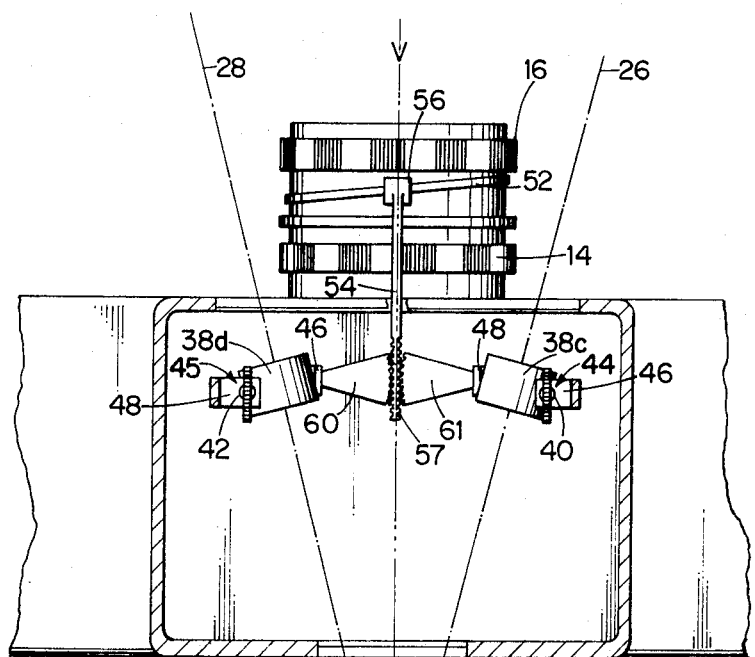

FIGS. 1-3 disclose one of many possible viewfinder structures which may be devised to implement the principles of this invention. The novel viewfinder 10 is illustrated as being incorporated in a photographic camera having a variable focus objective lens 12, a diaphragm-shutter unit 14, and an element of photographic film 18 located at the recording plane of the camera. The lens 12 is of a conventional type wherein rotation of a lens barrel 16 which supports the lens 12 causes the lens barrel and the lens to move along the optical axis 0—0 of the lens to change the focus thereof.

In accordance with this invention, the viewfinder 10 is shown as including a plurality of like assemblies 19a, 19b, 19c, and 19d of associated reticles and reticle imaging means. Referring particularly to assembly 19a which is broken away in FIG. 1, the reticles may take any of a number of forms, but are here shown as each comprising a mask 20 defining a translucent window 22, the shape of which determines the configuration of the respective framing marks 23a, 23b, 23c, and 23d. The framing marks 23a, 23b, 23c, and 23d are preferably, but not necessarily, corner-defining marks, as shown.

The reticle imaging means function to project virtual images 24a, 24b, 24c, and 24d of the framing marks 23a, 23b, 23c, and 23d into the field. In the FIGS. 1-3 embodiment the reticle imaging means are each shown as being dioptric, comprising a positive lens 25 of relatively high power spaced at most a focal length away from the mask 20. The associated pairs of reticle masks 20 and reticle imaging lenses 25 are each located on an auxiliary optical axis, hereinafter called a framing mark projection axis. These axes are labeled 26, 28, 30, and 32 in FIGS. 1-3. The axes are arranged so as to diverge into the field from a viewfinder window 34 located in a rear wall 36 of the viewfinder housing. It is necessary that the reticle projection axes converge in the vicinity of the window 34 in order that light constituting each of the virtual images 24a, 24b, 24c, and 24d of the framing marks may pass through the window 34 and be collected by an eye of an observer located behind the window 34.

In the interest of optimizing viewfinder compactness, the lenses 24 are preferably small and of relatively high power; these can be obtained commercially at relatively low cost since high correction is unnecessary. Because the composite frame is defined by a cooperative collection of individually projected framing marks, any distortions or other aberrations in the individual reticle images will not effect the general rectilinearity of the frame boundaries. This is not the case with conventional optical viewfinders wherein a single imaging surface, for example, the mirrorized back surface of a negative front element, images the entire frame and is apt to produce a distorted frame. Because the individual lenses 25 are relatively high power and thus have a relatively short focal length, the front-to-back depth of the viewfinder assembly can be substantially less than with conventional optical finders. Further, the avoidance of any need for partially reflective mirrors across the observer's field of view produces a view field of greater brightness than is presented by optical viewers of the Albada or brilliant frame type. Since the viewfinder optics in viewfinders constructed according to the principles of this invention project only framing marks and do not image the scene, none of the field image aberrations or demagnification associated with conventional optical finders are produced.

It is an object of this invention to provide a viewfinder having the capability of selectively varying the framed portion of the viewed field in accordance with focus adjustments in order to compensate for field size changes and sighting parallax errors. The term "sighting parallax" error is herein used to mean error due to a separation between the view axis and the camera objective axis, as distinguished from true parallax errors which concern the difference in perspective of an object as observed through the viewfinder from that as observed through the objective lens.

To this end, means are provided for adjusting the convergence of the framing mark projection axes 26, 28, 30, and 32 to effect a programmed coordinated translation of the projected framing mark images 24a, 24b, 24c, and 24d. It is manifest that rotation of the projection axes 26, 28, 30, 32 such that each axis swings in a plane containing that axis and the central view axis V—V will cause the framing marks to move radially with respect to the view axis V—V. Any movement of the auxiliary axis out of that plane will add a component of vertical and/or horizontal movement to the framing mark.

Numerous structures are contemplated for effecting movement of the auxiliary axes 26, 28, 30, 32; in the disclosed FIG. 1 embodiment, the lenses 25 and the associated reticle 20 masks are mounted in cans 38a, 38b, 38c, and 38d having shafts 40, 42 captured in bearings 44, 45 in support arms 46, 48 extending from a frame 50.

In order to cause movement of the framing mark images 24a, 24b, 24c, 24d to be responsive to focus adjustments of the objective lens 12, coupling means are provided. In the disclosed embodiment, a ring 52 on the barrel 16 of the variable focus lens 12 acts as a cam when the barrel 16 is rotated to adjust the focus of the lens 12. A slider 54 constrained to linear movement by pins 55 has at one end a cam follower 56 which engages and follows axial movements of the ring 52. At the other end the slider 54 has a rack 57 for driving bevel gears 60, 61 affixed to the shafts 42, 40 of cans 38c, 38d.

Bevel gear 60 drives can 38c and consequently can 38b through an intervening set of bevel gears 62, 63 affixed to the shafts 40, 42 on cans 38c, 38d, respectively. Similarly, bevel gear 61 drives can 38d and thus can 38a through an intervening set of bevel gears 64, 65 affixed to shafts 42, 40 on cans 38d, 38a, respectively.

It is manifest that rotation of the lens barrel 16 to adjust the focus of lens 12 will effect a translation of the slider 54. Translation of the slider 54 causes the cans 38a, 38b, 38c, 38d to pivot about their respective shafts 40, 42 to thereby effect a coordinated expensive or contractive radial displacement of the framing mark images 24a, 24b, 24c, 24d, and thus a change in the size and location of the frame defined thereby.

The movement of the framing mark images 24a, 24b, 24c, 24d can be programmed to follow a desired pattern of movement so as to compensate for field size changes and sighting parallax errors resulting from adjustments in the focus of lens 12. Such may be accomplished by appropriate selection of the radii of the bevel gears 60, 61, of the relative radii of bevel gears 62, 63 and 64, 65, of the profile of camming ring 52, and of the other pertinent mechanical and optical parameters in the overall system. For example, to cause the framed portion of the scene to descend as it is contracting responsive to a lens focus adjustment to record a closer object, the radii of bevel gears 63 and 65 can be made appropriately smaller than the radii of mating bevel gears 62 and 64.

Figure 4:
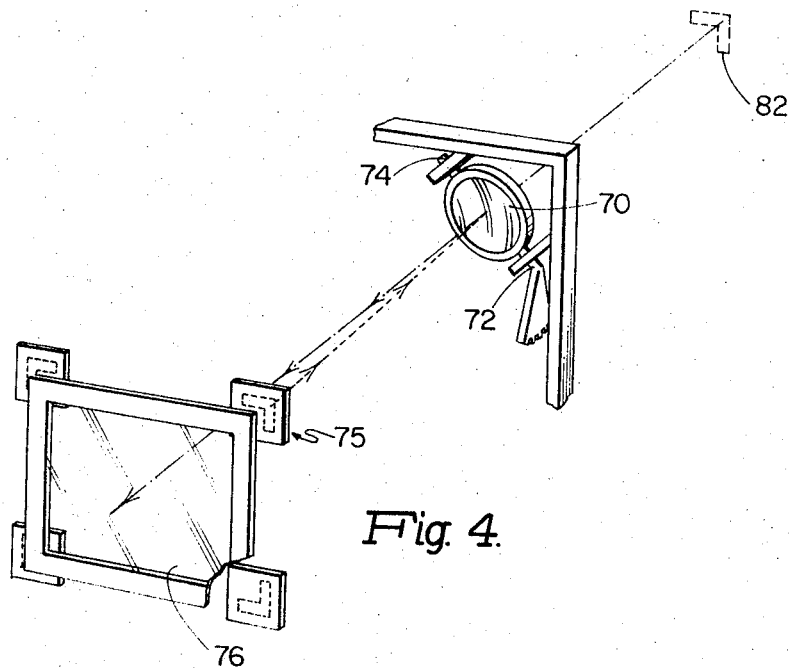
FIGS. 4 and 5 are fragmentary perspective and top(plan) views, respectively, of a viewfinder representing an alternative embodiment of the invention wherein catoptric, rather than dioptric, imaging means are employed to project virtual images of the frame-defining marks.
Figure 5:
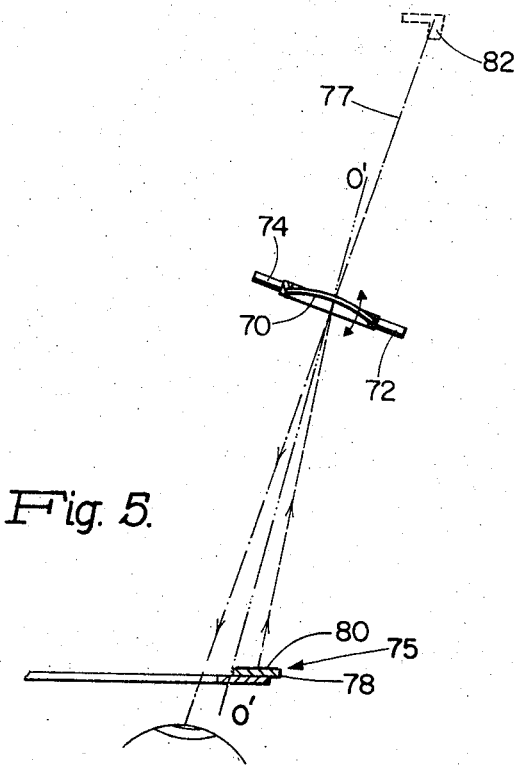

It is contemplated that numerous other projection systems may be devised to carry out the concepts of this invention. FIGS. 4–5 show a catoptric projection system which may be substituted for each of the dioptric projection systems shown in FIGS. 1–3. The FIGS. 4–5 system comprises a catoptric lens 70 mounted for rotation on shafts 72, 74. A reticle 75 located adjacent one of the corners of view window 76 is located off-axis with respect to the optical axis 0'—0' of the lens 70. The focal length of the lens 70 is equal to or greater than the distance between the reticle 75 and the lens 70 such that the lens 70 will form a virtual image of the reticle 75 along a projection axis 77.

The reticle 75 is shown as comprising a plate 78 carrying, for example, a reflective coating 80 having the configuration of the desired framing mark. The coating 80 may be illuminated by ambient light entering the viewfinder through the primary opening in the forward wall of the viewfinder housing or may be illuminated artificially. Similar reticles may be located at the other corners of the view window 76 for illuminating other such catoptric projection systems. Each lens 70 is designated to be pivoted on the shafts 72, 74 to vary the angle of the respective projection axis 77 and thus the apparent location of the projected framing mark image 82 in the viewed field. Following the teachings set forth above with respect to FIGS. 1–3, a plurality of systems are employed and are interconnected and coupled to movement of the focus control mechanism for the associated camera to cause the size and location of the framed portion of the viewed field to vary in response to adjustments of the focus of the camera objective.

The invention is not limited to the particular details of construction of the embodiments depicted, and it is contemplated that various and other modifications and applications will occur to those skilled in the art. For example, means other than as shown may be employed to project virtual images of individual framing marks which cooperate when viewed in composite to frame a portion of a viewed field. Other means may be devised according to this invention for effecting angular rotation of the individual reticle projection axes to vary the framed portion of the viewed field. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. For use in a photographic camera, a viewfinder for visibly framing a portion of a viewed field, comprising:
    means providing a view of a field;
    a plurality of discrete reticle means respectively defining framing marks;
    a corresponding plurality of reticle imaging means, each associated with a different one of said reticle means, for projecting virtual images of the associated framing marks into the viewed field; and
    means for positioning the associated pairs of reticle means and reticle imaging means around the periphery of the viewed field such that said virtual images of said framing marks are separated in the field and collectively frame a generally rectangular area of the field.

2. The apparatus defined by claim 1 wherein said reticle means each comprise a mask defining a light-transmitting window having a prescribed shape which determines the configuration of the respective framing mark.

3. The apparatus defined by claim 1 wherein said reticle means each include a light-reflective pattern having a prescribed shape which defines the configuration of the respective framing mark.

4. For use in a photographic camera, a viewfinder for visibly framing a portion of a viewed field, comprising:
    four discrete reticle means respectively defining framing marks;
    four reticle imaging means, each associated with a different one of said reticle means, for projecting virtual images of the associated framing marks into the viewed field; and
    means for positioning the associated pairs of reticle means and said associated reticle imaging means such that said virtual images of said framing marks are separated in the field and collectively mark the corners of a generally rectangular area of the field.

5. In a photographic camera having a variable focus objective lens and focus control means for adjusting the focus of said objective lens, a variable frame viewfinder for visibly framing a variable portion of a viewed field, comprising:
a plurality of discrete reticle means respectively defining framing marks;
a corresponding plurality of reticle imaging means, one associated with each of said reticle means, for projecting virtual images of the associated framing marks into the viewed field;
means for positioning the associated pairs of reticle means and reticle imaging means such that said virtual images of said framing marks are separated in the field and collectively frame a portion of the field; and
frame varying means coupled to said associated pairs of reticle means and reticle imaging means and responsive to adjustments in said focus control means for collectively displacing said images of said framing marks so as to vary according to a predetermined program the portion of the field framed thereby.

6. The apparatus defined by claim 5 wherein said reticle means each comprise a mask defining a light-transmitting window having a prescribed shape which determines the configuration of the respective framing mark, and wherein said reticle imaging means each comprise a positive power dioptric lens spaced at most a focal length away from its associated mark.

7. The apparatus defined by claim 5 wherein said reticle means each include a light-reflective pattern having a prescribed shape which defines the configuration of the respective framing mark.

8. The apparatus defined by claim 7 wherein said reticle imaging means each comprise a positive power mirror positioned to receive light reflected from said pattern and to reflect it to said viewfinder viewing location along the said respective reticle projection axis.

9. In a photographic camera having a variable focus objective lens and focus control means for adjusting the focus of said objective lens, a variable frame viewfinder for visibly framing a variable portion of a viewed field, comprising:
means providing a view of a field;
four discrete reticle means respectively defining framing marks;
four reticle imaging means, one associated with each of said reticle means, for projecting virtual images of the associated framing marks into the viewed field;
means for positioning the associated pairs of reticle means and reticle imaging means around the periphery of the viewed field such that said virtual images of said framing marks are separated in the field and collectively mark the corners of a generally rectangular area of the field; and
frame varying means coupled to said associated pairs of reticle means and reticle imaging means and responsive to adjustments in said focus control means for collectively displacing said images of said framing marks so as to vary according to a predetermined program the portion of the field framed thereby.

10. The apparatus defined by claim 9 wherein said reticle means each comprise a mask defining a light-transmitting window having a prescribed shape which determines the configuration of the respective framing mark, and wherein said reticle imaging means each comprise a positive power dioptric lens spaced at most a focal length away from its associated mark.

11. The apparatus defined by claim 4 wherein said reticle means each include a light-reflective pattern having a prescribed shape which defines the configuration of the respective framing mark.

12. The apparatus defined by claim 7 wherein said reticle imaging means each comprise a positive power mirror positioned to receive light reflected from said pattern and to reflect it to said viewfinder viewing location along the said respective reticle projection axis.

13. For use in a photographic camera, a viewfinder for visibly framing a portion of a viewed field, comprising:
means providing a view of a field;
a plurality of discrete reticle means respectively defining framing marks, said reticle means each comprise a mask defining a light-transmitting window having a prescribed shape which determines the configuration of the respective framing mark;
a corresponding plurality of reticle imaging means, one associated with each of said reticle means, for projecting virtual images of the associated framing marks into the viewed field, said reticle imaging means each comprise a positive power dioptric lens spaced at most a focal length away from its associated mark; and
means for positioning the associated pairs of reticle means and reticle imaging means around the periphery of the viewed field such that said virtual images of said framing marks are separated in the field and collectively frame a generally rectangular area of the field.

14. For use in a photographic camera, a viewfinder for visibly framing a portion of a viewed field, comprising:
means providing a view of a field;
a plurality of discrete reticle means respectively defining framing marks, said reticle means each include a light-reflective pattern having a prescribed shape which defines the configuration of the respective framing mark;
a corresponding plurality of reticle imaging means, one associated with each of said reticle means, for projecting virtual images of the associated framing marks into the viewed field, said reticle imaging means each comprise a positive power catoptric lens positioned to receive light reflected from said pattern and to reflect it to said view location along the said respective reticle projection axis; and
means for positioning the associated pairs of reticle means and reticle imaging means around the periphery of the viewed field such that said virtual images of said framing marks are separated in the field and collectively frame a generally rectangular area of the field.

* * * * *